United States Patent [19]

Becker

[11] 4,181,251

[45] Jan. 1, 1980

[54] RECORD CARRIER WITH SAFETY FEATURES CAPABLE OF BEING CHECKED MECHANICALLY AND METHOD OF CHECKING SAID SAFETY

[75] Inventor: Wolfgang Becker, Munich, Fed. Rep. of Germany

[73] Assignee: G.A.O. Gesellschaft für Automation und Organisation mbH, Fed. Rep. of Germany

[21] Appl. No.: 955,770

[22] Filed: Oct. 30, 1978

Related U.S. Application Data

[63] Continuation of Ser. No. 690,865, May 28, 1976.

[30] Foreign Application Priority Data

Jun. 10, 1975 [AT] Austria .................. 4422/75

[51] Int. Cl.$^2$ .......... G06K 7/08; G06K 5/00; G06K 19/06
[52] U.S. Cl. .................. 235/451; 235/380; 235/488
[58] Field of Search ......... 235/451, 380, 487, 488, 235/492

[56] References Cited

U.S. PATENT DOCUMENTS

| | | | |
|---|---|---|---|
| 3,043,505 | 7/1962 | Brown | 235/451 |
| 3,044,694 | 7/1962 | Davidson et al. | 235/451 |
| 3,370,277 | 2/1968 | Van Goetham | 235/451 |
| 3,519,802 | 7/1970 | Cinque et al. | 235/451 |
| 3,636,318 | 1/1972 | Linstrom et al. | 235/488 |
| 3,831,008 | 8/1974 | Bradshaw | 235/451 |
| 3,835,301 | 9/1974 | Barney | 235/451 |
| 3,869,082 | 3/1975 | Ludin | 235/451 |

Primary Examiner—Daryl W. Cook
Attorney, Agent, or Firm—McGlew and Tuttle

[57] ABSTRACT

The record carrier has a card base, on which there are deposited an electrically highly conductive layer and an electrically highly insulating layer with the interposition therebetween of a chemically homogeneous intermediate layer into which safety features or information can be introduced by varying the conductivity of selected areas of the intermediate layer to provide areas of different respective electrical conductivities. In the method, the safety features or information are mechanically checked or read by applying a short voltage pulse between the conductive layer and an auxiliary electrode in contact with the insulating layer, with the charge image produced on the insulating layer being then scanned and evaluated in a measuring instrument, after which evaluation the charge image is deleted. For mechanically checking the record carrier for intactness, as a safeguard against erasure, a longer voltage pulse is applied between the auxiliary electrode and the conductive layer, the longer voltage pulse having a length such that a uniform distribution of charge is obtained on the insulating layer, after which the charge image of the insulating layer is scanned by a measuring instrument, evaluated, and deleted after the evaluation. Either procedure may be used alone or both may be used successively.

9 Claims, 9 Drawing Figures

4,181,251

RECORD CARRIER WITH SAFETY FEATURES CAPABLE OF BEING CHECKED MECHANICALLY AND METHOD OF CHECKING SAID SAFETY

This is a continuation, of application Ser. No. 690,865 filed May 28, 1976.

FIELD AND BACKGROUND OF THE INVENTION

The present invention relates to a record carrier, such as an identification card, a credit card, and the like, with safety features capable of being checked mechanically, and to a method of checking such safety features.

It has been known for a long time to accomodate, in securities, safety features which serve to provide protection against forgery. The best known examples are the safety threads and the watermarks. These safety features are primarily intended for visual checking, i.e. for checking by the person receiving the security. They are suitable for mechanical checking under special conditions only. Therefore, a large number of safety features capable of being checked mechanically have been proposed, such as the introduction into the paper of mottled filaments, fluorescent substances, radioactive or magnetically active additions, etc.

Furthermore, a number of methods are known by which the information imposed on an authentic document can be protected against falsification. This is done, for example, by embossing, by applying polarizing or fluorescent layers, by coding the information, e.g. in the form of holograms, or by writing the information in invisible form, e.g. on a magnetic strip.

It is common to all these methods that the information, even in scrambled form, is present on the record carrier as a real image of the signal conveying the information. The protective measures only make the information unintelligible (coding) and/or the signal is written in as a modulation of a physical property of the base material which cannot be perceived through the human senses, but can be observed by means of generally known measuring instruments. It is also possible to apply a safeguard against erasure, e.g. in the form of fluorescent or polarizing layers or of embossments which is to indicate any manipulations of the written information. By "safeguard against erasure", not only the protection against erasure is understood, but also quite generally the protection against manipulations designed to change the information, such as cutting the record carrier into pieces and putting it together again in a different form.

Unlike the authenticity protection, the hitherto known methods of protecting the imposed information against forgery do not completely meet the requirements placed on them. In a large number of cases, it is not necessary at all to understand the information in order to be able to forge the document, but it is frequently sufficient to copy the coded information. The other hand, those methods in which the information is written invisibly use precisely those materials and technical aids which are generally known and are easily obtainable at many places and at relatively low cost. A typical example of this is the coded writing of information on magnetic strips.

Persons skilled in the art are aware of these problems. In addition, most of the known methods are only partially suitable for use in automatic machines. The checking in automatic machines cannot normally cover the complete document. The checking process is generally limited to a fast and reliable test as to whether or not the prescribed signals are present at given points. This limitation entails the grave disadvantage of opening up a wide field of possibilities for forgery by collages. To do this, the document is cut into pieces and put together again in changed form. The signals then occur at a different point, whereby the information has been falsified, but the cuts are not detected during the mechanical verification.

SUMMARY OF THE INVENTION

An object of the invention is to provide a forgery-proof record carrier which has the property that the safety features, irreversibly written into it and capable of conveying information through their arrangement, are hidden, and that the features cannot be reproduced by a copying process. Another object of the invention is to provide checking methods which make it possible to check both the features or information for falsifications and the record carriers themselves for forgery by collages.

The invention thus relates to a record carrier, such as an identification card, a credit card, and the like, with safety features or information capable of being checked mechanically, and to suitable methods of checking the features or information for falsifications.

The invention is characterized in that an electrically highly conductive and an electrically highly insulating or dielectric layer are deposited on the card base, and that between these two layers there is provided a chemically homogeneous layer into which the safety features or information can be introduced by varying the electrical conductivity thereof.

The chemically homogeneous layer may be a semiconductor layer or a photoconductor layer. Suitable photoconductor layer materials are selenium or selenium with additions of tellurium. As is well known, both in the semiconductor layer and in the photoconductor layer, a variation of the degree of crystal order can be achieved. This is used in the invention to create, in the information-carrying, chemically homogeneous layer, defined areas of different electrical conductivity, it being generally sufficient to use only two different conductivity values. The different conductivity areas in the chemically homogeneous layer can be produced, in known manner, with a thermocompression head, for example.

For increased safety, several areas with the two conductivity values may be provided on the record carrier. If the conductivity areas are suitably arranged and delimited, they can also be used as coded information. After the record carrier has been finished, the information-carrying layer so prepared remains covered by the thin insulating layer and thus defies direct measurement because the permanently present features or information are stored as a latent image. A measurable and erasable signal is obtained by a method which is also a subject matter of the invention and requires, in addition to general technical knowledge of the subject, a knowledge of special data if it is to be carried out successfully.

Since the safety features are entered invisibly and irreversibly, any forgery or falsification is practically impossible, because such manipulations are definitely detected by the checking methods.

The method according to the invention for mechanically checking or reading the safety features or information is characterized in that, on the electrically highly insulating layer, a charge image corresponding to the electrical conductivity areas of the chemically homogeneous layer is produced by bringing an areal auxiliary electrode into contact with the insulating layer and applying a short voltage pulse across the auxiliary electrode and the conductive layer, and that the charge image produced on the insulating layer is then scanned and evaluated in a measuring instrument, and deleted again after the evaluation. The term "areal", as used herein, is defined in Webster's New World Dictionary, Second College Edition, and in the New Century Dictionary, as the adjective of "area", and thus means an element having an "rea", such as within the lines of a plane geometrical figure.

As stated above, it is possible to falsify the record carriers by cutting them into pieces and putting them together again, thus forming other permissible combinations of the conductivity areas of the chemical layer. It is then possible that the record carriers so forged cannot be recognized as forgeries by means of the check explained above.

To be able to definitely detect such manipulations, too, according to another aspect of the invention, an additional checking method is carried out which differs from the first checking method only in that, instead of the short voltage pulse, a long voltage pulse is applied, so that a uniform distribution of charge independent of the safety features or information is obtained on the insulating layer. This distribution of charge is then checked in a suitable measuring instrument, with cuts in the record carrier appearing as interruptions of the uniform distribution of charge.

It is obvious that the two checking methods may be carried out separately if required. The first checking method will be sufficient if manipulations of the record carrier by collages are impossible. On the other hand, it may be desirable to detect collages only. In this case, the second checking method alone will be sufficient, which thus serves to check the safeguard against erasure. The only prerequisite for this is that the record carrier have an electrically highly conductive and an electrically highly insulating layer, while, for the checking of the safeguard against erasure, the chemically homogeneous layer, which serves to form the safety features or information, is not required in the record carrier.

The checking methods may be carried out with the record carrier either in motion or at rest.

The invention has the big advantage that, with the technological means for introducing the electrically conductive layer into the record carrier, which means are selectable within wide limits, it is possible to safeguard the authenticity of the record carrier already during the manufacture. This is comparable to the introduction of a safety thread.

Another advantage of the invention lies in the fact that any reproduction of the record carrier by a copying process covering the features introduced is prevented, because these features are hidden, and because, in addition, the physical process by which the features or information are written differs from that by which they are checked.

A further advantage of the invention is that even if the check is automatic, forgeries made by cutting and recomposing authentic record carriers are definitely detected.

An undamaged information-carrying area gives a uniform distribution of charge in the second checking method. If, however, the area has been cut, in which case the test track must be crossed at least once, there will be no charge at the cuts. Any successful patching of the insulating and the electrically conductive layer is impossible because of the dependence of the sparking potential on the electrode separation or spacing, as stated in Paschen's Law.

If the number of written signals is known, cuts in the record carrier can also be detected without the second checking step. In that case, a cut would appear as an additional signal in the charge image during the first checking procedure and could thus be detected.

According to another aspect of the invention, the number of times the record carrier can be used can be limited in a simple manner if, each time the record carrier is used, an additional signal is written, by means of a thermocompression head, into a space of the record carrier provided for this purpose. A signal so stored is not erasable, because the writing operation brings the semiconductor closer to its state of thermodynamic equilibrium characterized by the periodicity of the atoms. The checking device determines the number of these signals. If the number of signals indicating the use exceeds a given number, the record carrier will be considered invalid.

The record carrier can be made invalid in a simple and irreversible manner in automatic machines, too. To do this, a thermocompression head writes such a number of signals into the space indicating the use that the given maximum number of uses is exceeded. This makes the record carrier invalid in an irreversible manner.

For an understanding of the principles of the invention, reference is made to the following description of typical embodiments thereof as illustrated in the accompanying drawings.

DESCRIPTION OF THE PREFERRED EMBODIMENTS

Figure 1:
FIG. 1 is a sectional view of a record carrier, embodying the invention, in its neutral form.

In the embodiments, the record carrier is assumed to be a card which is shown in its neutral form in FIG. 1. It comprises a base 1 on which a metal film 2, preferably aluminum, is deposited by evaporation. Evaporated on the metal film 3 is an amorphous selenium layer 3, with a crystallization inhibitor, e.g. arsenic, previously added to the selenium. The selenium layer 3 is covered with a thin dielectric film 4.

Figure 2:
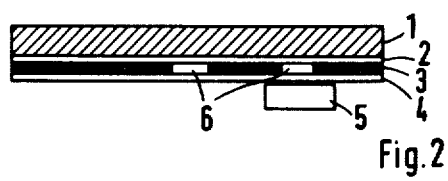
FIG. 2 is a sectional view of the record carrier of FIG. 1 with written features or information incorporated therein.

To introduce the safety features or information into the selenium layer 3, the conductivity of this layer is changed at given points by means of the thermocompression head 5. In FIG. 2 it is assumed that two features 6 have been written in, which is done by simultaneously generating at these points a suitable pressure and temperature by means of the thermocompression head, whereby a crystallization process is started.

As a result, the short-range order in the selenium layer 3 is improved and, consequently, the electrical conductivity is locally increased. The necessary local heating can also be achieved by exposure to laser light.

The method according to the invention for reading and checking the latently written features or information will now be described with the aid of FIGS. 3 to 7. For clarity's sake it will be assumed that only two different conductivity areas $6a$ and $6b$ are present in the selenium layer 3.

Figure 3:
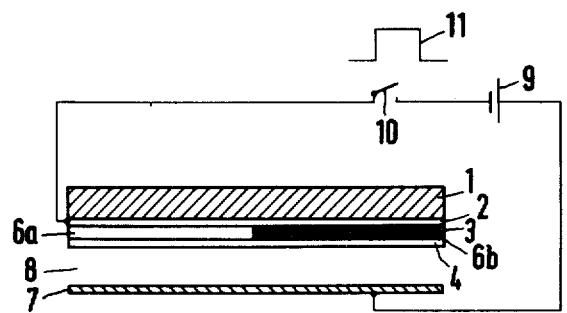
FIGS. 3, 4, and 5 are sectional views schematically illustrating the arrangements and circuits for carrying out the first checking method.

FIG. 3 shows the arrangement by means of which a charge image corresponding to the features $6a$ and $6b$ is written into the insulating layer 4. The direct-current source 9 has one terminal connected to the aluminum layer 2, and the other to the auxiliary electrode 7. The latter is brought into contact with the dielectric layer 4. By closing the switch 10, a voltage pulse 11 whose duration is of the order of a few milliseconds and whose magnitude may range between 380 V and 1 kV is applied to the two electrodes.

Figure 4:
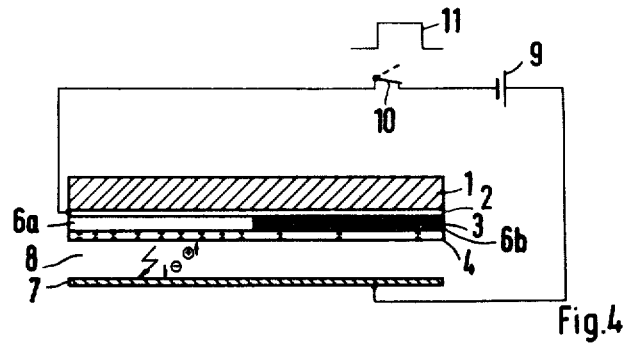
Figure 5:
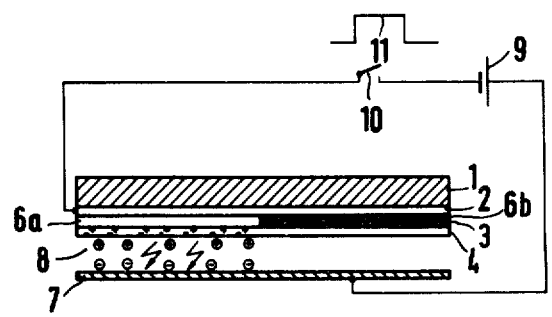
Figure 6:
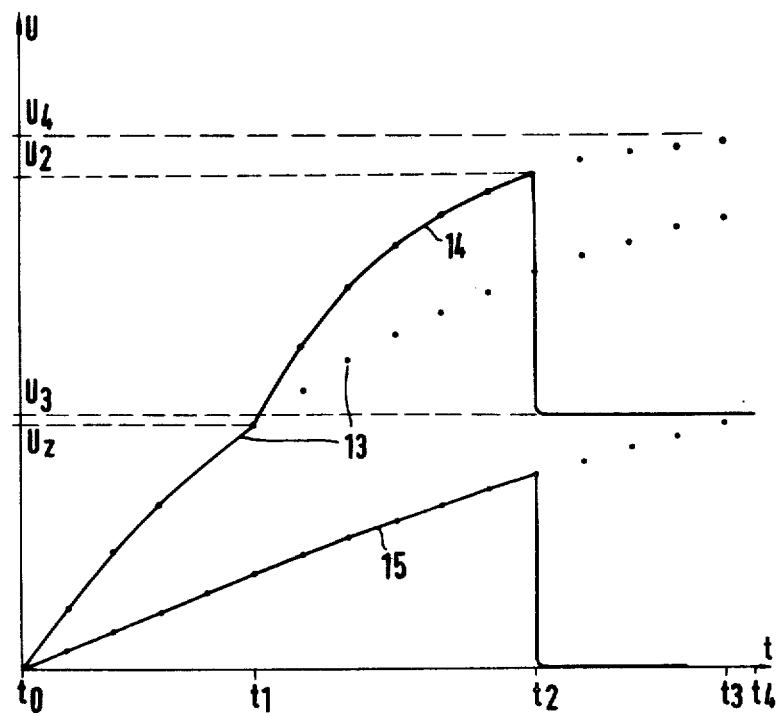
FIG. 6 is a graphical representation showing the voltage curves at the dielectric layer in the first checking method.

FIGS. 4 and 5 show the charging processes at the application of the voltage pulse, with the virtual air gap 8 shown considerably enlarged for the sake of clarity. These figures will be understood in conjunction with the explanation of FIG. 6, which is a graphical representation of the voltage conditions in the dielectric layer 4 at the areas $6a$ and $6b$.

The voltage between the two surfaces of the dielectric layer 4 is plotted against time, so that exponential curves with three different relaxation times are obtained.

The curve 15 is the exponential voltage curve for that area of the layer 4 which is in contact with the area $6b$ of lower conductivity of the layer 3. From the application of the pulse 11 at the instant $t_o$ until the end of the pulse 11 at the instant $t_2$, the voltage increases continuously. When the switch 10 is open again, the voltage returns to zero.

A different voltage curve is obtained for the area $6a$. As the curve 13 shows, in the area associated with the area $6a$, the voltage across the dielectric increases faster than in the remaining area $6b$ until the sparking voltage $U_z$ between the dielectric 4 and the auxiliary electrode 7 is reached at the instant $t_1$.

From the instant $t_1$, the charging process at the dielectric 4 is effected via a gas discharge, but at a higher speed than before, as shown by the curve 14, so the voltage $U_2$ is reached at the end of the pulse 11. If the voltage is turned off again at the instant $t_2$, only the ions deposited by the gas discharge will remain on the dielectric layer 4. This results in a clear charge difference between those areas on the dielectric 4 associated with $6a$ and $6b$ (O and $U_3$).

The charge image of the dielectric layer 4 can now be measured in a suitable manner. This is shown schematically in FIG. 7. To do this, a sensor 16 is placed near the dielectric layer 4 after the auxiliary electrode 7 has been removed. The measurement is performed with a measuring instrument 17 (shown schematically). After the measurement, the charge image is deleted again by suitable means. The sensor 16 and the measuring instrument 17 are known and commercially available devices. For example, a suitable device comprising a test capacitor as a sensor, namely static detector head 2503, is sold by Keithley Instruments which also sells a directly connected electrometer useful as the measuring instrument 17 and known as "Keithley Electrometer 610C".

The check of the safeguard against erasure will now be explained with the aid of FIGS. 8 and 9.

Figure 8:
FIG. 8 is a view, similar to FIG. 1, but showing a record carrier with only three layers.
Figure 9:
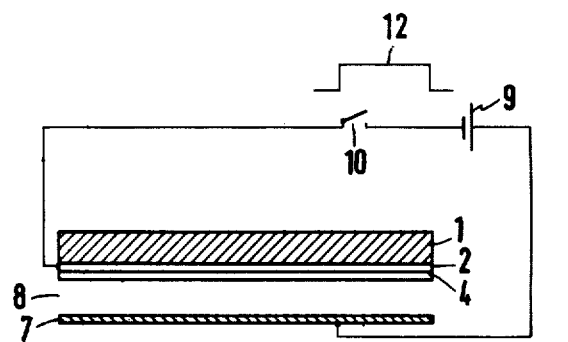
FIG. 9 is a sectional view schematically illustrating the checking of the erasure safeguard, of the record carrier of FIG. 8, by the second checking method.
Figure 7:
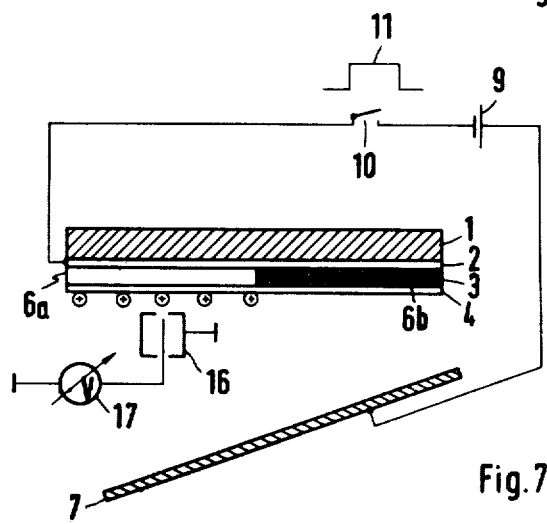
FIG. 7 is a sectional view schematically illustrating the arrangements and circuits for deleting the charge images after the check.

FIG. 8 shows a card with only three layers, i.e. with no information-carrying layer 3, because only the safeguard against erasure is to be checked here. The check is performed as in the example of FIGS. 1 to 5, with the only exception that a voltage pulse 12 of sufficiently long duration is now applied until at the instant $t_3$ the gas discharge has started over the entire area of the card. If the voltage continues to be applied, both curves 14 and 15 finally reach the voltage $U_4$ at the instant $t_4$. Thus, the same charge density is obtained at all points of the dielectric layer. If, however, manipulations have been performed on the card by cutting it into pieces and recomposing it, the uniform charge image will be interrupted accordingly. These interruptions can be detected with the sensor 16 because a voltage drop is present there.

What is claimed is:

1. A record carrier, such as an identification card, a credit card, and the like, with invisible safety features or information capable of being checked mechanically, said record carrier comprising, in combination, a card base; and an electrically highly conductive layer and an electrically highly insulating layer disposed on said base with the interposition therebetween of a chemically homogeneous intermediate layer of photoconductor material consisting essentially of selenium or of selenium with additions of tellurium, the invisible safety features or information being introduced into said chemically homogeneous intermediate layer by varying the conductivity of selected areas of said intermediate layer to provide areas of different respective electrical conductivity.

2. A record carrier, such as an identification card, a credit card, and the like, with invisible safety features or information capable of being checked mechanically, said record carrier comprising, in combination, a card base; and an electrically highly conductive layer and an electrically highly insulating layer disposed on said base with the interposition therebetween of a chemically homogeneous intermediate layer of semiconductor material into which the invisible safety features or information are introduced by varying the conductivity of selected areas of said intermediate layer to provide areas of different respective electrical conductivities.

3. A method of mechanically checking or reading the invisible safety features or information of a record carrier including a card base and an electrically highly conductive layer and an electrically highly insulating layer disposed on the card base with the interposition therebetween of a chemically homogeneous intermediate layer made of at least one of a photoconductor material and a semiconductor material into which the invisible safety features or information can be introduced by varying the conductivity of selected areas of the intermediate layer to provide areas of different respective electrical conductivities, said method comprising the steps of positioning an areal auxiliary electrode into virtual contact with said insulating layer; applying a short voltage pulse between said auxiliary electrode and said conductive layer to produce a charge image on said insulating layer; providing a measuring instrument; scanning said charge image on said insulating layer to sense said charge image, said charge image corresponding to the invisible safety features or information introduced into said intermediate layer, said measuring instrument being used for said scanning; and, after such scanning, discharging and deleting said charge image on said insulating layer.

4. A method according to claim 3 comprising moving said record carrier past said measuring instrument.

5. A method according to claim 3 comprising maintaining said record carrier at rest and moving said measuring instrument.

6. A method according to claim 3 wherein said varying of conductivity of selected areas in said intermediate layer is produced by thermocompression.

7. A method, as claimed in claim 3, including the additional steps of, for checking the record carrier for forgeries and falsifications, applying between said auxiliary electrode and said conductive layer a voltage pulse having a length such that a uniform distribution of charge is obtained on the insulating layer; providing a measuring instrument; utilizing the measuring instrument to scan the charge image of the insulating layer; evaluating the scanning; and after such evaluation, deleting the charge image.

8. A method of mechanically checking the intactness, as a safeguard against erasure and collages, of a record carrier having planar surfaces and including at least one electrically highly conductive layer and at least one electrically highly insulating layer, said method comprising the steps of positioning an areal auxiliary electrode into virtual contact with the planar electrically highly insulating layer; applying, between said auxiliary electrode and the electrically highly conductive layer, a voltage pulse having a length such that a uniform distribution of charge is obtained on said electrically highly insulating layer; providing a measuring instrument; utilizing said measuring instrument to scan the charge image of the electrically highly insulating layer; evaluating the measured scanning; and, after the evaluation, deleting the charge image.

9. A record carrier, such as an identification card, a credit card, and the like, the invisible safety features or information capable of being checked mechanically, said record carrier comprising, in combination, a card base; and an electrically highly conductive layer and an electrically highly insulating layer disposed on said base with the interposition therebetween of a chemically homogeneous intermediate layer of photoconductive material, the invisible safety features of information being introduced into said chemically homogeneous intermediate layer by varying the conductivity of selected areas of said intermediate layer to provide areas of different respective electrical conductivity.

* * * * *